(12) United States Patent
Fasick

(10) Patent No.: US 11,665,998 B2
(45) Date of Patent: Jun. 6, 2023

(54) AGRICULTURAL VEHICLE WITH ADJUSTABLE MAXIMUM SPEED RESOLUTION

(71) Applicant: CNH Industrial America LLC, New Holland, PA (US)

(72) Inventor: Gregory T. Fasick, Hatfield, PA (US)

(73) Assignee: CNH Industrial America LLC, New Holland, PA (US)

( * ) Notice: Subject to any disclaimer, the term of this patent is extended or adjusted under 35 U.S.C. 154(b) by 608 days.

(21) Appl. No.: 16/795,515

(22) Filed: Feb. 19, 2020

(65) Prior Publication Data

US 2020/0260646 A1    Aug. 20, 2020

Related U.S. Application Data

(60) Provisional application No. 62/807,944, filed on Feb. 20, 2019.

(51) Int. Cl.
*F16H 61/47* (2010.01)
*A01D 41/127* (2006.01)
(Continued)

(52) U.S. Cl.
CPC ....... *A01D 41/1274* (2013.01); *A01D 34/006* (2013.01); *A01D 41/06* (2013.01); *A01D 41/127* (2013.01); *G06F 7/02* (2013.01); *A01D 34/664* (2013.01); *A01D 41/14* (2013.01); *A01D 57/20* (2013.01); *F16H 61/47* (2013.01); *F16H 61/472* (2013.01); *G06Q 10/063* (2013.01); *G06Q 50/02* (2013.01)

(58) Field of Classification Search
CPC .............. A01D 41/127; A01D 41/1274; A01D 34/006; A01D 41/06; A01D 34/664; A01D 41/14; A01D 57/20; F16H 61/472; G06F 7/02; G06Q 10/063; G06Q 50/02
See application file for complete search history.

(56) References Cited

U.S. PATENT DOCUMENTS 3,324,637 A * 6/1967 Windsor ................ A01D 41/16
56/2
4,513,562 A * 4/1985 Strubbe ................ A01D 41/127
56/10.2 G (Continued)

FOREIGN PATENT DOCUMENTS

DE          19536345 A1 * 4/1997 ............. A01B 59/06
DE     102017201701 A1 * 8/2018 ........... A01B 59/064
(Continued)

*Primary Examiner* — Arpad F Kovacs
(74) *Attorney, Agent, or Firm* — Peter Zacharias

(57) ABSTRACT

An agricultural vehicle includes a chassis, a header carried by the chassis, an operator cab carried by the chassis, wheels carried by the chassis, at least one wheel driver coupled to at least one of the wheels and configured to drive the at least one coupled wheel at a wheel drive speed, a control handle placed in the operator cab that is displaceable from a zero speed position to a maximum speed position, and a controller operably coupled to the at least one wheel driver. The controller is configured to receive a header type signal indicating a header type of the header and output a resolution signal to the at least one wheel driver to define the maximum speed amount based at least partially on the received header type signal.

14 Claims, 9 Drawing Sheets

(51) Int. Cl.
  *A01D 41/06* (2006.01)
  *A01D 34/00* (2006.01)
  *G06F 7/02* (2006.01)
  *A01D 34/66* (2006.01)
  *A01D 41/14* (2006.01)
  *A01D 57/20* (2006.01)
  *G06Q 10/063* (2023.01)
  *G06Q 50/02* (2012.01)
  *F16H 61/472* (2010.01)

(56) References Cited

U.S. PATENT DOCUMENTS

| | | | |
|---|---|---|---|
| 6,519,923 B1* | 2/2003 | Cooksey | A01D 41/16 |
| | | | 56/14.9 |
| 7,748,489 B2 | 7/2010 | Sheidler et al. | |
| 9,253,943 B2 | 2/2016 | Buermann et al. | |
| 9,788,480 B2 | 10/2017 | Nafziger et al. | |
| 10,034,425 B2* | 7/2018 | Ducroquet | A01D 41/142 |
| 10,080,328 B2 | 9/2018 | Kraus | |
| 10,462,966 B2* | 11/2019 | Smith | A01D 41/127 |
| 10,701,863 B2* | 7/2020 | Foster | A01D 41/141 |
| 11,140,825 B2* | 10/2021 | Karst | A01D 41/145 |
| 2009/0241499 A1* | 10/2009 | Maertens | A01D 41/127 |
| | | | 56/11.1 |
| 2012/0102905 A1* | 5/2012 | Dold | A01D 41/16 |
| | | | 56/12.7 |

FOREIGN PATENT DOCUMENTS

| | | | | |
|---|---|---|---|---|
| EP | 0347979 | A1 * | 12/1989 | A01D 41/127 |
| EP | 3146832 | A1 * | 3/2017 | A01D 34/03 |

\* cited by examiner

AGRICULTURAL VEHICLE WITH ADJUSTABLE MAXIMUM SPEED RESOLUTION

FIELD OF THE INVENTION

The present invention pertains to an agricultural vehicle and, more specifically, to an agricultural windrower or other agricultural vehicle incorporating an agricultural header.

BACKGROUND OF THE INVENTION

Self-propelled windrowers are utilized by farmers to cut crop material as the windrower advances across a field and arrange the cut crop material into windrows, which are deposited onto the field behind the windrower to dry. Typical windrowers have a header at the front which will cut the crop material and are driven by a pair of primary wheels controlled independently in a dual path control method and linked to one or more wheel drivers, such as an internal combustion engine and/or hydraulic pumps. The windrower can also include a pair of caster wheels at the rear of the windrower.

During operation, a user will often utilize a multi-function handle (MFH), which is also commonly referred to as a forward-neutral-reverse (FNR) handle, to control the movement of the windrower. The MFH is linked to the wheel driver(s) and displaceable to control the speed at which the wheels are driven. Typically, the MFH has a set "resolution" that increases the output of the wheel driver(s) as the MFH displaces from a zero speed position to a maximum speed position. Greater displacement of the MFH from the zero speed position corresponds to a greater output to the wheels to generally increase the propulsion speed of the windrower. In some instances, the resolution is not as sensitive as the user would like, which leads to user complaints and may limit the user's ability to precisely control the ground speed of the windrower.

What is needed in the art is a windrower or other agricultural vehicle that provides a user with the ability to precisely control windrower ground speeds in various instances.

SUMMARY OF THE INVENTION

Exemplary embodiments disclosed herein provide an agricultural vehicle that can define a maximum speed amount of one or more wheel drivers for propelling the vehicle based on the type of header that is mounted to the vehicle.

In some exemplary embodiments provided in accordance with the present disclosure, an agricultural vehicle includes a chassis, a header carried by the chassis, an operator cab carried by the chassis, a plurality of wheels carried by the chassis, at least one wheel driver coupled to at least one of the wheels, the at least one wheel driver being configured to drive the at least one coupled wheel at a wheel drive speed, a control handle placed in the operator cab, the control handle being displaceable from a zero speed position to a maximum speed position and operably coupled to the at least one wheel driver such that displacement of the control handle from the zero speed position to the maximum speed position changes the wheel drive speed by a maximum speed amount, and a controller operably coupled to the at least one wheel driver. The controller is configured to receive a header type signal indicating a header type of the header and output a resolution signal to the at least one wheel driver to define the maximum speed amount based at least partially on the received header type signal.

In some exemplary embodiments, a method of adjusting a ground speed resolution of a control handle of an agricultural vehicle is provided. The agricultural vehicle includes a plurality of wheels, at least one wheel driver coupled to at least one of the wheels and operably coupled to a controller, and a header. The method is performed by the controller and includes receiving a header type signal indicating a header type of the header; and outputting a resolution signal to the at least one wheel driver to define a maximum speed amount at which the at least one wheel driver drives the at least one coupled wheel. The resolution signal is based at least partially on the header type signal, the control handle is displaceable from a zero speed position to a maximum speed position, and the at least one wheel driver is configured to drive the at least one coupled wheel at the maximum speed amount when the control handle is at the maximum speed position.

A possible advantage that may be realized by exemplary embodiments provided in accordance with the present disclosure is that defining the maximum speed amount based at least partially on the header type can allow the user to precisely control the speed of the vehicle when different headers, which may have different optimal propulsion speeds, are attached to the vehicle.

Another possible advantage that may be realized by exemplary embodiments provided in accordance with the present disclosure is that the maximum speed amount can be set by the user based on manufacturer determined settings.

Yet another possible advantage that may be realized by exemplary embodiments provided in accordance with the present disclosure is that the maximum speed amount can be set relatively when the user wishes to attach a header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
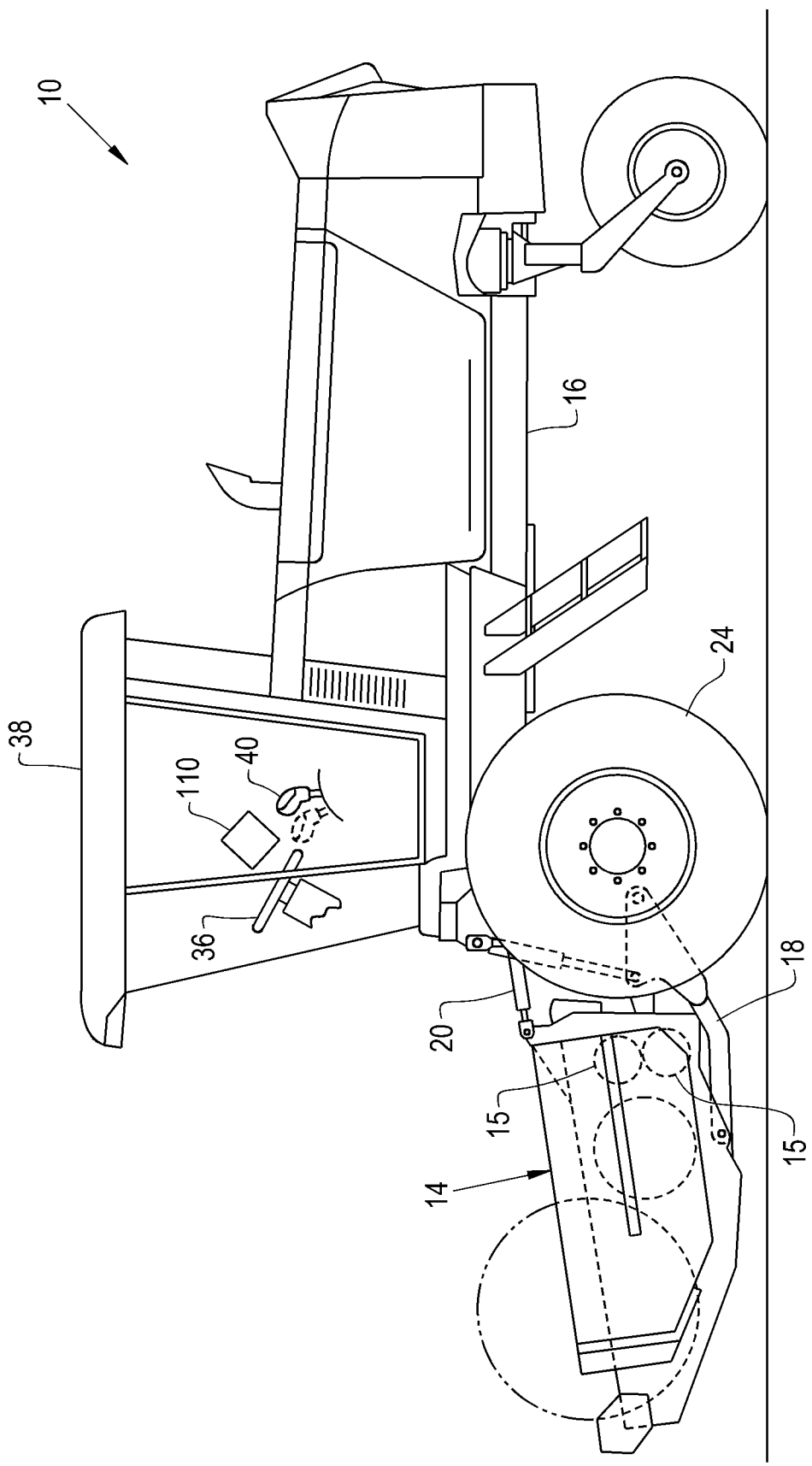
FIG. 1 illustrates a side view of an exemplary embodiment of an agricultural vehicle in the form of a windrower, the windrower comprising a header and a controller for adjusting a maximum speed amount of the windrower, in accordance with an exemplary embodiment of the present invention.

Referring now to the drawings, and more particularly to FIG. 1, an exemplary embodiment of an agricultural vehicle 10 in the form of a self-propelled windrower is illustrated. The windrower 10 includes a chassis 16 and a header 14 carried by the chassis 16 at a front of the windrower 10. It should be appreciated that while the exemplary embodiment of the agricultural vehicle 10 is illustrated and described as a windrower, the agricultural vehicle can be other types of vehicles such as, for example, a mower, a spreader, a windrow inverter, or a combine harvester. The header 14 may be of generally any suitable construction and design, and may include not-only crop-harvesting mechanisms, but also crop conditioners such as elongate rolls 15. Such attachment of the header 14 to the chassis 16 is achieved through a pair of lower arms 18 (only the left one being shown, the right being generally the same) pivoted at one end to the chassis 16 and at the other end to the header 14, as well as through a central upper link 20.

Figure 2:
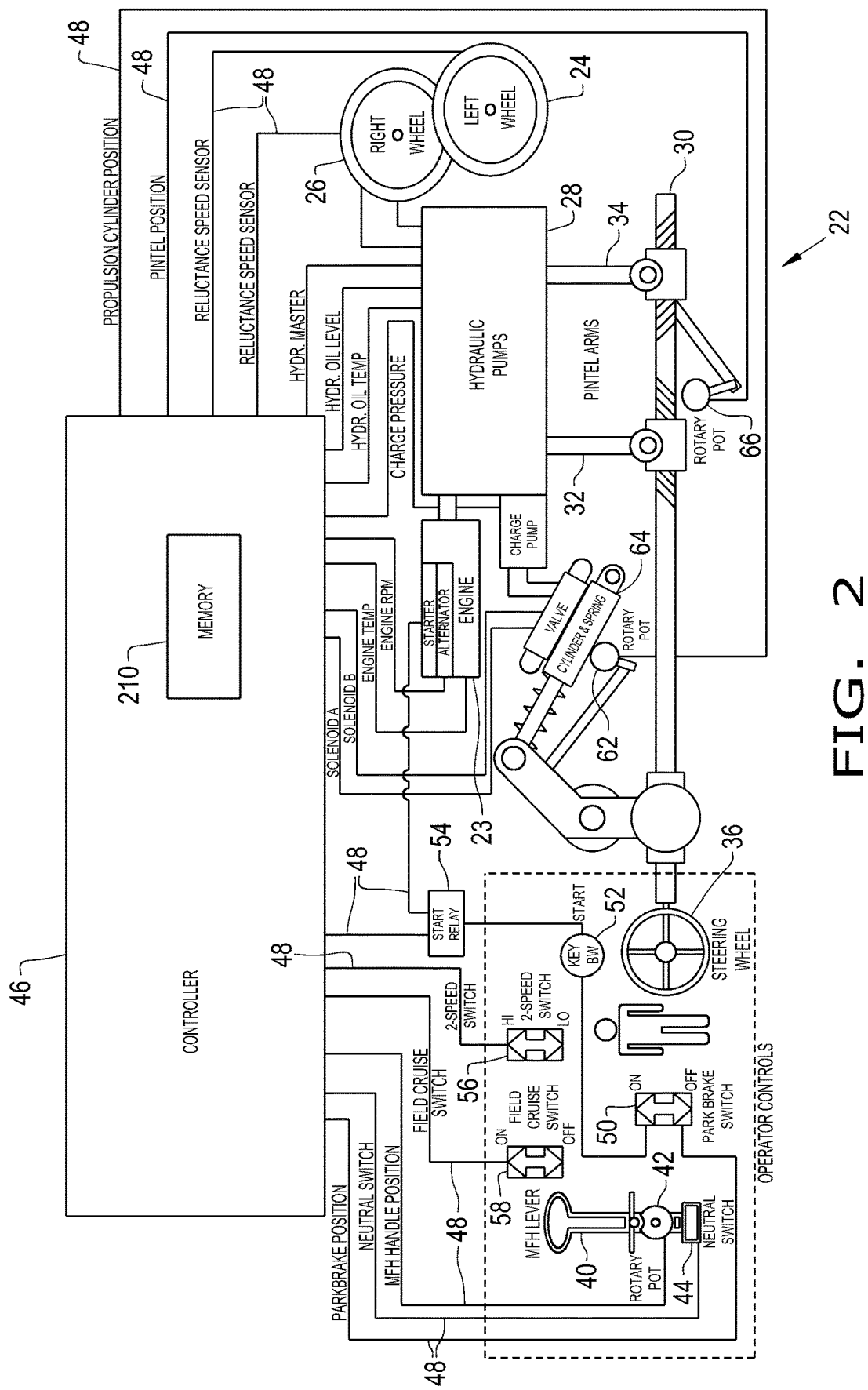
FIG. 2 illustrates an exemplary embodiment of a driveline that may be incorporated in the windrower of FIG. 1 to control the propulsion speed of the windrower, in accordance with an exemplary embodiment of the present invention.

Referring also to FIG. 2, the windrower 10 includes a propulsion driveline 22 controllably operable using operator controls for rotatably driving a left wheel 24 and a right wheel 26 for propelling windrower 10 over a ground or other surface. Hydraulic motors and pumps 28, which may be also be referred to as "wheel drivers," are coupled with one or both wheels 24 and 26, respectively, for driving the wheels 24, 26. The wheel drivers 28 are labeled as "HYDRAULIC PUMPS" in FIG. 2, because the wheel drivers 28 include hydraulic pumps, but it should be appreciated that the wheel drivers 28 may also include one or more hydraulic motors supplied with pressurized fluid by the pumps. The pumps of the wheel drivers 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps in a known manner. Steering commands are inputted to driveline 22 by an operator via an operator control which is a steering wheel 36 disposed in an operator cab 38 of the windrower 10. Steering movements of the windrower 10 are effected by rotating respective wheels 24 and 26 at different speeds. Propulsion speed and direction commands are inputted to the driveline 22 by an operator via a control handle 40, which may be a multi-function handle (MFH) or forward-neutral-reverse (FNR) lever that is disposed in the cab 38.

The control handle 40 is configured to operate a suitable sensor or sensors operable for generating varying information or outputs representative of the position of the control handle 40 when the control handle 40 is displaced, which may include one or two rotary potentiometers 42 and a neutral switch 44, each of which is connected to a controller 46 via a suitable conductive path or paths 48, which can be, for instance, a wire or wires of a wiring harness, an optical path, a wireless path, or the like. The control handle 40 is displaceable from a zero speed position, which may also be referred to as a "neutral position," to a maximum speed position. The control handle 40 is illustrated in the zero speed position in solid lines in FIG. 1 and illustrated in the maximum speed position in dashed lines. Movements of the control handle 40 in relation to the zero speed position will cause potentiometers 42 to output varying signals representative of the position of the control handle 40, which signals comprise voltages. These voltage signals can precisely indicate the position of the control handle 40, such that precise control of the forward and rearward movements of the windrower 10 can be achieved.

The neutral switch 44 can also be mounted and configured such that movements of the control handle 40 into the neutral position, and out of the neutral position, will cause changes in the operating state of the switch 44. Here, forward and rearward movements of the control handle 40 from a generally straight up neutral position shown, will effect a change of state of the switch 44 which will be outputted to the controller 46, which will responsively power up the wheel driver(s) 28, the controller 46 controlling the propulsion speed of windrower 10 as a function of the voltage outputs of one or both potentiometers 42. For example, when the control handle 40 is forwardly displaced to the maximum speed position, the controller 46 will control the output of the wheel driver(s) 28 to drive one or both of the wheels 24, 26 at a maximum wheel speed to achieve a maximum forward wheel speed, which corresponds to a maximum forward speed amount of the windrower 10. Similarly, rearward movement of the control handle 40 from the neutral position will effect a change of state of the switch 44 outputted to the controller 46 to affect operation of the propulsion driveline in the reverse direction, and the voltage output of one or both of the potentiometers 42 will be used to control reverse speed. In some embodiments, when the control handle 40 is moved into the neutral position, the propulsion system be controlled to positively de-stroke or otherwise transition into a non-propelling state over time, such that abrupt stoppage does not occur.

Other operator controls may include a park brake switch 50 also connected to the controller 46 via a conductive path 48, and via another conductive path 48 to a key switch 52 and a start relay 54 in connection with a starter of an engine 23 and with the controller 46. A 2-speed switch 56 is connected to the controller 46 via another conductive path 48, as is a field cruise switch 58.

The controller 46 may be connected to a second controller via a controller area network (CAN). The second controller is in connection with a rotary potentiometer 62 via a conductive path 48, the potentiometer 62 being operable for outputting information representative of the position of a propulsion cylinder 64. The propulsion cylinder 64 is extendable and retractable by solenoids controlled by the second controller, based on the voltage outputs of at least one of the potentiometers 42, to move a propulsion rod 30 longitudinally for changing the stroke of the hydraulic pumps of the wheel driver(s) 28 via the angle of the pintel arms 32 and 34, for effecting propulsion of the windrower 10. A rotary potentiometer 66 is operable for outputting information representative of the position of the pintel arms 32 and 34 to the second controller via another conductive path 48, providing information representative of differential stroking of the pumps of the wheel driver(s) 28 to effect steering movements. Information representative of speed of respective wheels 24 and 26 is determined by reluctance speed sensors and is communicated via conductive paths 48 to the second controller. Differences in the speed readings is also indicative of steering movements. It should be appreciated that while a second controller is described, the previously described functions of the second controller may instead, or additionally, be incorporated into the controller 46.

From the foregoing, it should be appreciated that the control handle 40 is displaceable from the zero speed position in a first direction through a range of positions to a maximum speed position in the first direction to change the wheel drive speed by a maximum forward speed amount, and from the zero speed position in a second direction through a range of positions to a maximum reverse speed position in the second direction to change the wheel drive speed by a maximum reverse speed amount. One direction of displacement will effect movement of the windrower 10 in the forward direction, and the other direction will effect movement in the rearward direction. Movement of the windrower 10 is achieved by the wheel driver(s) 28 driving one or both of the wheels 24, 26 to the wheel drive speed, with higher wheel drive speeds generally corresponding to higher propulsion speeds. At the maximum speed amounts, the wheel driver(s) 28 drive the wheel(s) 24, 26 at the maximum wheel speed to, for example, pursue maximum propulsion speed of the windrower 10. The controller 46 is configured for receiving the signals outputted by the potentiometer or potentiometers 42, and generating transfer function signals for determining speed command signals to be outputted to the solenoids controlling the propulsion cylinder 64 for controlling the speed of the propulsion driveline 22 as a function of the received signals.

Users may desire that the maximum propulsion speed for operating an agricultural vehicle change when different types of headers are used. For example, a user may desire for the vehicle to propel forwardly across a field at a faster speed when the attached header is a disc-type header compared to when the header is a sickle-type or draper-type header. Disc-type, sickle-type, and draper-type headers are well-known in the art. An exemplary disc-type header is disclosed in U.S. Pat. No. 8,931,245; an exemplary sickle-type header is disclosed in U.S. Pat. No. 9,699,959; and an exemplary draper-type header is disclosed in U.S. Pat. No. 7,277,785; each of which is incorporated in their entirety herein by reference. As used herein, a "draper-type" header is a header that incorporates a belt conveyor for moving crop material towards the center of the header, rather than an auger conveyor. In known agricultural vehicles, the control handle for controlling the propulsion speed has a set "resolution" that defines the change in the wheel drive speed based on the displacement of the control handle. For example, the resolution may be set to adjust the wheel drive speed so the vehicle changes its propulsion speed by 2 km/h (on flat terrain) for every 1 cm of control handle displacement. Because the control handle has a set maximum displacement amount, the resolution may be overly sensitive, i.e., speed adjustment per control handle displacement is too low, when a disc-type header is attached to the agricultural vehicle at this resolution. Alternatively, the resolution may not be sensitive enough, i.e., speed adjustment per control handle displacement is too high, when a sickle-type or draper-type header is attached to the agricultural vehicle if the set resolution is used for a disc-type header.

To address the previously described issues, and referring now also to FIGS. 3-8, the controller 46 that is provided in accordance with the present disclosure is configured to receive a header type signal indicating a header type of the header 14 and output a resolution signal to the at least one wheel driver 28 to define the maximum speed amount based at least partially on the received header type signal. For example, the controller 46 may be configured to define the maximum speed amount, which corresponds to the maximum wheel drive speed, based on preset values for each specific header type and user input. As illustrated in FIG. 1, a display 110, such as a touchscreen display, may be placed in the operator cab 38 next to the control handle 40 and the steering wheel 36. The display 110 may be operably coupled to the controller 46 and configured to output the header type signal to the controller 46. Such a configuration allows a user to interact with the display 110 and select the maximum speed amount/maximum wheel drive speed of the windrower 10, and thus set the resolution of the control handle 40.

Figure 3:
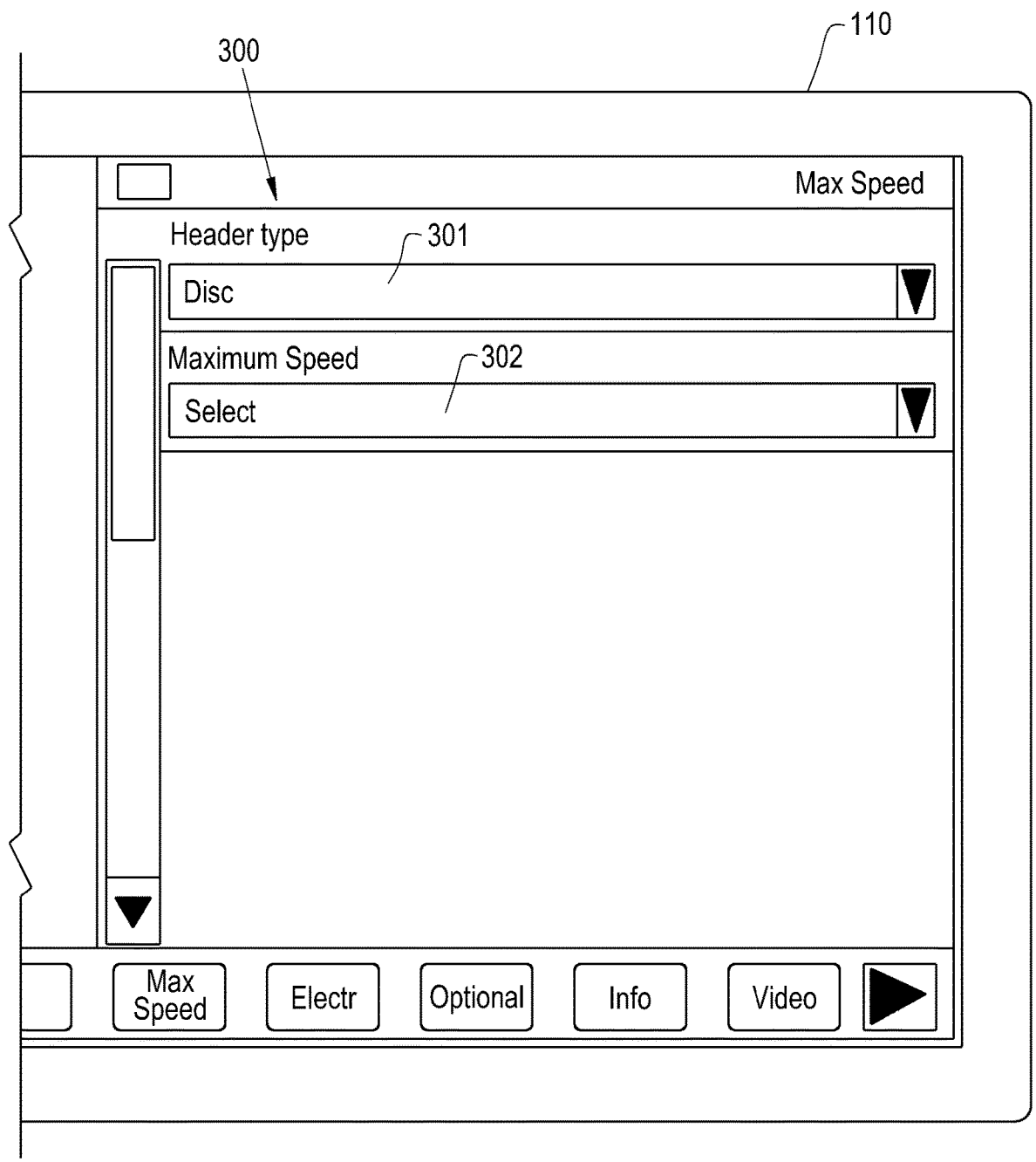
FIG. 3 illustrates an exemplary embodiment of a graphical user interface (GUI) presented on a display for selecting a maximum speed amount corresponding to a maximum propulsion speed of the windrower of FIG. 1, in accordance with an exemplary embodiment of the present disclosure.
Figure 4:
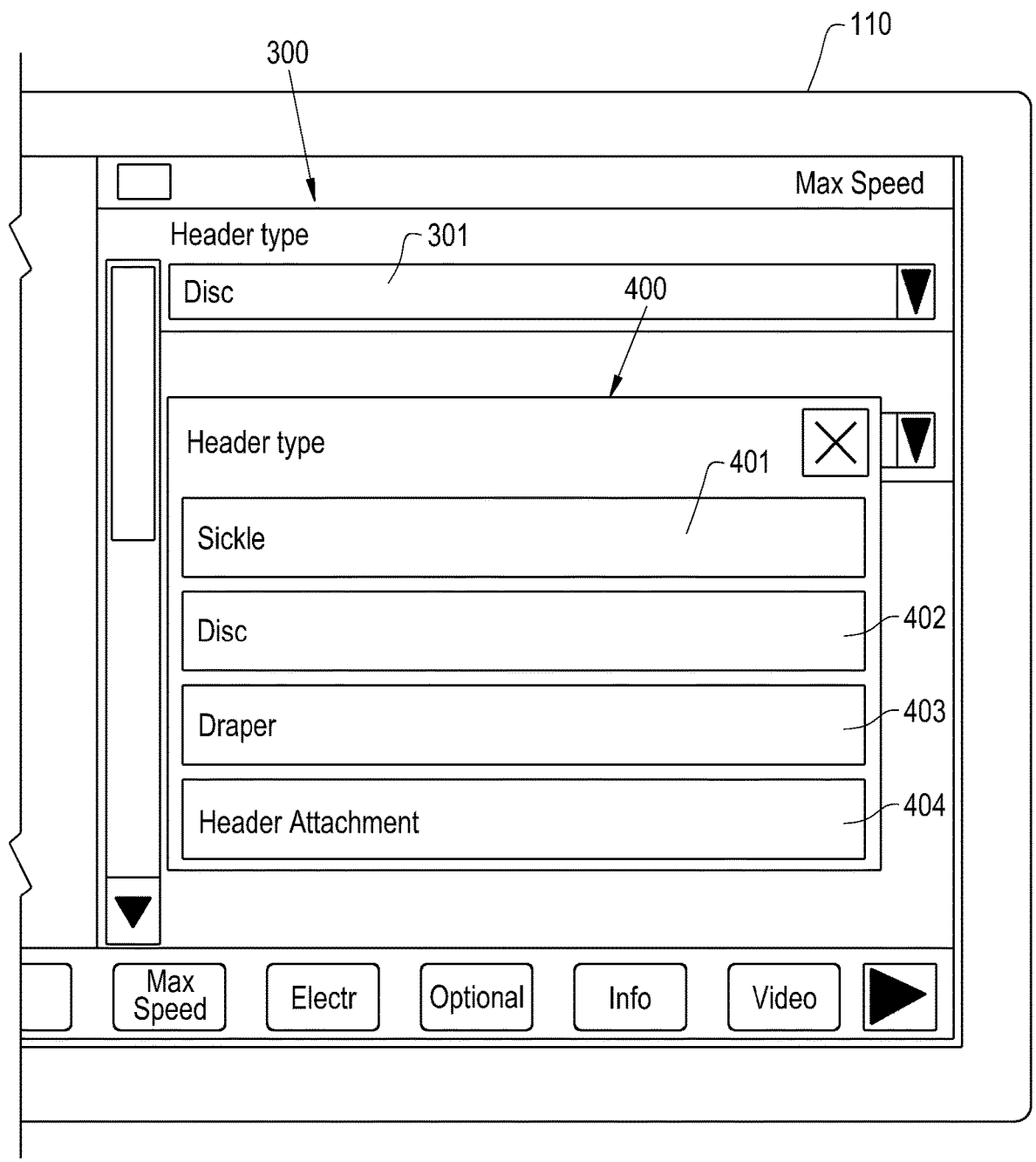
FIG. 4 illustrates a drop-down menu for selecting a header type in the GUI illustrated in FIG. 3, in accordance with an exemplary embodiment of the present disclosure.

Referring specifically now to FIG. 3, the display 110 is illustrated presenting a graphic user interface (GUI) 300 with various icons that a user may interact with to control various functions of the controller 46. Code for displaying and controlling the GUI 300 may be stored, for example, in a memory 210 (illustrated in FIG. 2) of the controller 46. As illustrated, the GUI 300 may present various sub-menu selection icons 301, 302 that a user can select to output signals to the controller 46. The sub-menu selection icon 301, for example, may cause the display 110 to present a header type drop-down menu 400, which is illustrated in FIG. 4, when the user selects the icon 301. The header type drop-down menu 400 may present several header choice icons, illustrated as four header choice icons 401, 402, 403, and 404, that each correspond to a respective header type signal that is output to the controller 46 when selected. When the user selects the header choice icon 402 labelled as "Disc," for example, the header type signal that is output to the controller 46 by the display 110 can correspond to a disc header type signal. After the controller 46 receives the disc header type signal, the controller 46 can then output a resolution signal to the wheel driver(s) 28 to set the maximum speed amount based at least partially on the received disc header type signal.

Figure 5:
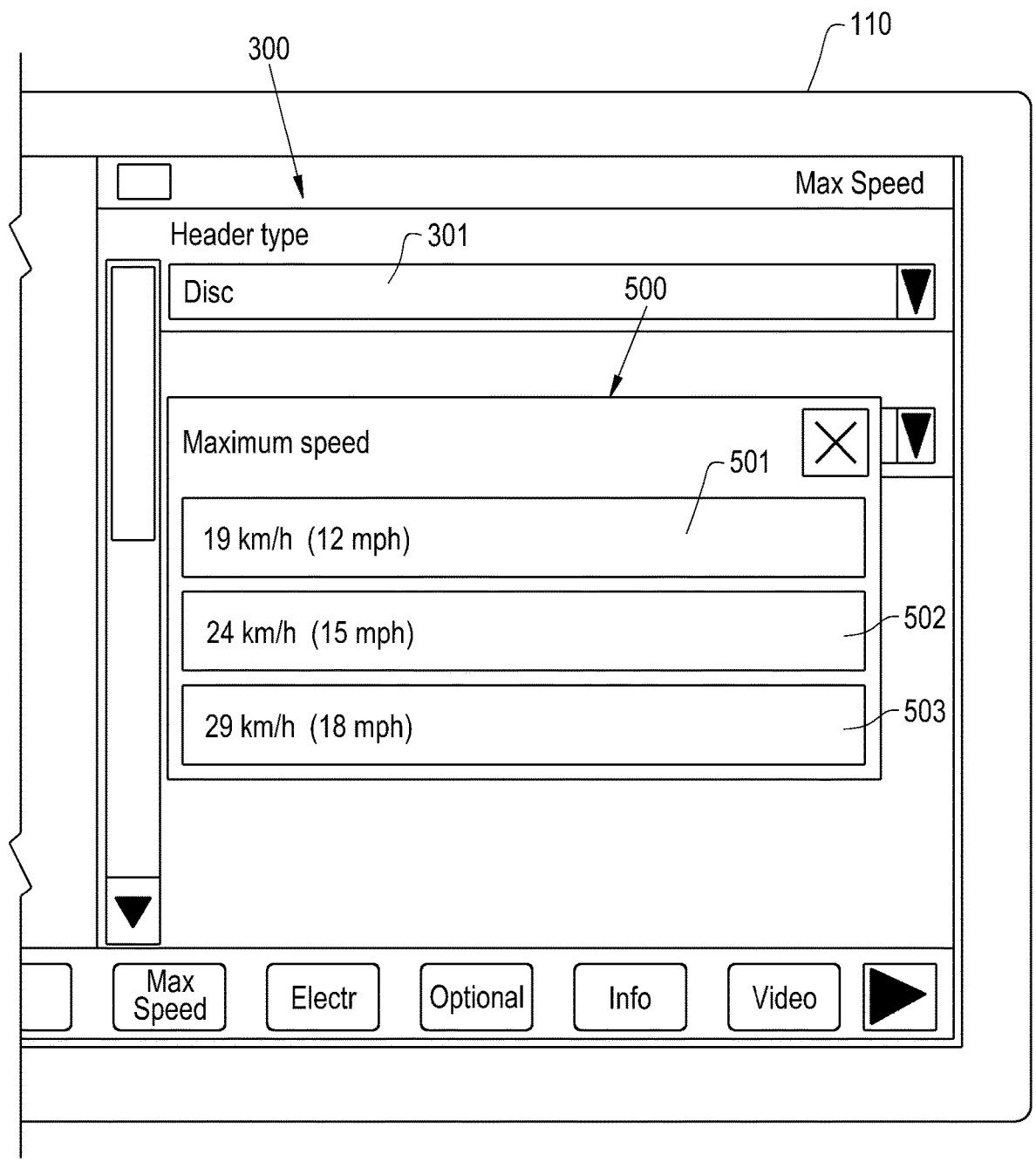
FIG. 5 illustrates a drop-down menu for selecting a maximum speed amount of the windrower of FIG. 1 when the header is a disc-type header, in accordance with an exemplary embodiment of the present disclosure.

Referring now to FIG. 5 as well, the user may select the sub-menu selection icon 302, which is labelled as "Maximum Speed," to pull up a maximum speed sub-menu 500 presenting various maximum propulsion speed icons 501, 502, 503 for the windrower 10. In some embodiments, the presented maximum propulsion speeds are displayed in miles per hour (mph), in addition to or alternatively to kilometers per hour (km/h), as illustrated in FIGS. 5-8. Whether the presented maximum propulsion speeds are displayed in km/h and/or mph can be an option that is chosen by the user, as is known. When the user selects the maximum propulsion speed icon 502, for example, the display 110 can output a maximum propulsion speed signal to the controller 46. Upon receiving the maximum propulsion speed signal, the controller 46 can output the resolution signal to the wheel driver(s) 28 to define the maximum speed amount to correspond to a maximum propulsion speed of 24 km/h.

The output resolution signal causes the maximum speed amount, and thus the set resolution of the control handle 40, to change. In some embodiments, the wheel driver(s) 28 is configured to linearly increase the wheel drive speed as the control handle 40 displaces from the zero speed position to the maximum speed position. For example, if the control handle 40 displaces 12 centimeters from the zero speed position to the maximum speed position and the maximum speed amount is set to correspond to a maximum propulsion speed of 24 km/h, the set resolution can cause the wheel drive speed to change so the windrower 10 experiences 2 km/h of propulsion speed change (on flat terrain) for each centimeter of displacement of the control handle 40 from the zero speed position. Thus, if a user desired to forwardly propel the windrower 10 at 10 km/h in this example, the user would need to forwardly displace the control handle 40 so the control handle 40 was 5 centimeters from the zero speed position in the forward direction.

If, instead, the user selected the maximum propulsion speed icon 503, which would cause the maximum speed amount to be set to correspond to a maximum propulsion speed of 29 km/h, the set resolution would cause the wheel drive speed to change so the propulsion speed of the windrower 10 experiences a propulsion speed change of approximately 2.5 km/h for each centimeter of displacement of the control handle 40 from the zero speed position. In this instance, a user would need to displace the control handle 40 forwardly by approximately 4 centimeters to propel the windrower at 10 km/h when the maximum propulsion speed icon 503 is selected rather than the maximum propulsion speed icon 502. Thus, it should be appreciated that the set resolution can be adjusted based not only on the header type, but also user preference for each header type.

Figure 6:
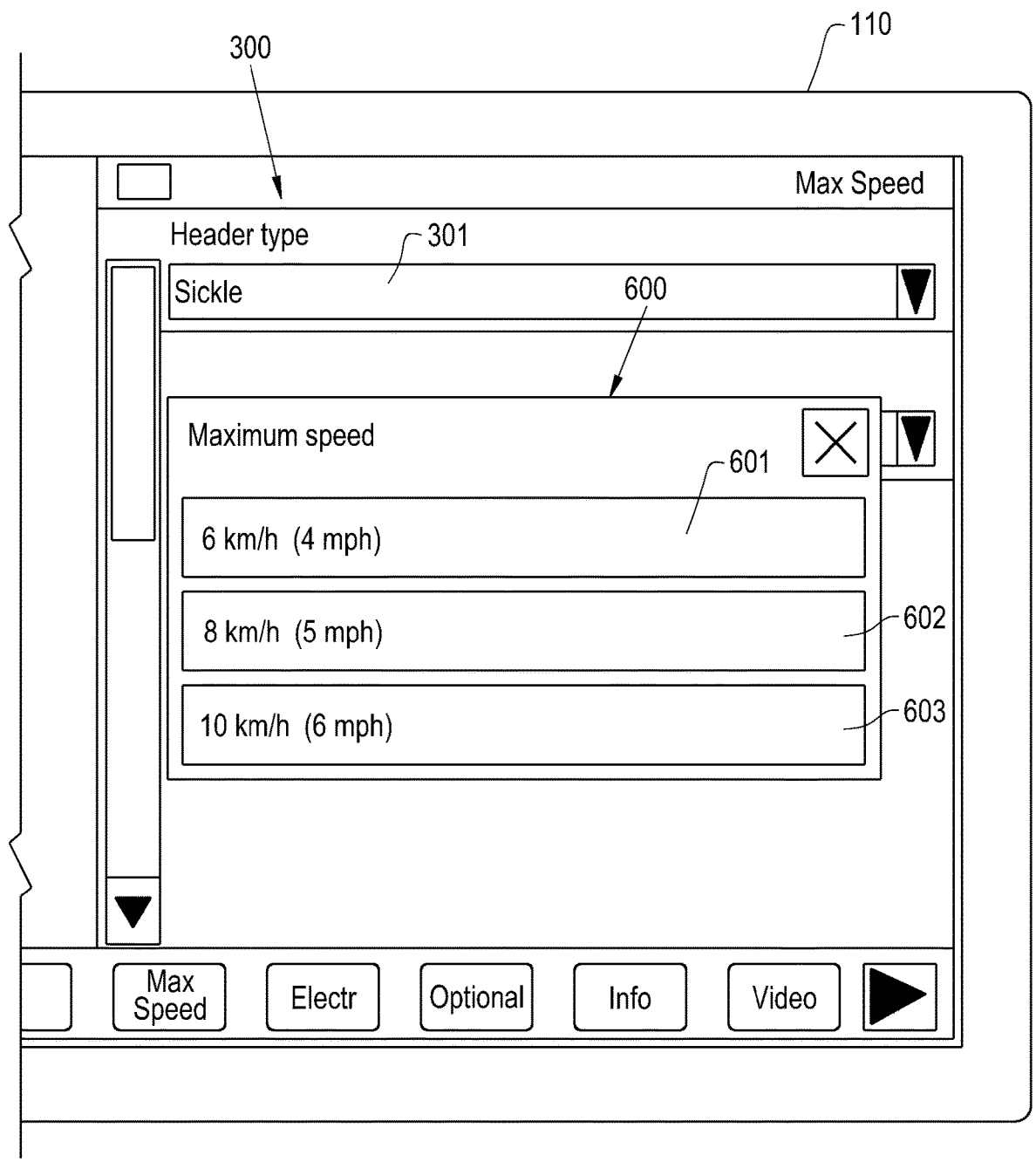
FIG. 6 illustrates a drop-down menu for selecting a maximum speed amount of the windrower of FIG. 1 when the header is a sickle-type header, in accordance with an exemplary embodiment of the present disclosure.

Referring now to FIG. 6, the display 110 is illustrated when the header choice icon 401 is selected, which corresponds to a sickle-type header, rather than the header choice icon 402. When the sickle-type header choice icon 401 is selected, selecting the sub-menu selection icon 302 can pull up a maximum speed sub-menu 600 that presents various maximum propulsion speed icons 601, 602, 603 for selection. As can be appreciated in comparing FIGS. 5 and 6, the maximum propulsion speed icons 601, 602, 603, which correspond to propulsion speeds for operating a sickle-type header, present maximum speeds that are lower than the maximum propulsion speed icons 501, 502, 503, which correspond to propulsion speeds for operating a disc-type header. This is due to sickle-type headers generally needing to operate at lower propulsion speeds than disc-type headers. When the user selects the maximum propulsion speed icon 601, for example, the display 110 can output a new maximum propulsion speed signal to the controller 46. Upon receiving the new maximum propulsion speed signal, the controller 46 can output a new resolution signal to the wheel driver(s) 28 to define the maximum speed amount so it corresponds to a new maximum propulsion speed of 6 km/h.

Since the new maximum propulsion speed is 6 km/h, rather than 24 km/h or 29 km/h, the set resolution of the control handle 40 changes. For the same 10 cm of control handle displacement between the zero speed position and the maximum speed position, the new set resolution becomes 0.6 km/h of propulsion speed change for each 1 cm of displacement of the control handle 40 from the zero speed position. This set resolution is significantly more sensitive than the set resolution for a disc-type header, due to a sickle-type header generally operating at lower propulsion speeds, so the user can more precisely adjust the propulsion speed of the windrower 10 when the header 14 is a sickle-type header. If the user desires to set the maximum propulsion speed to different values for operating the sickle-type header, such as 8 km/h or 10 km/h, the user can select the maximum propulsion speed icon 602 or 603, respectively. Thus, it should be appreciated that exemplary embodiments of windrower 10 provided in accordance with the present disclosure can allow adjustment of the resolution of the control handle 40 based on the type of header that is attached to the windrower 10 to account for different propulsion speeds at which different types of headers generally operate.

Figure 7:
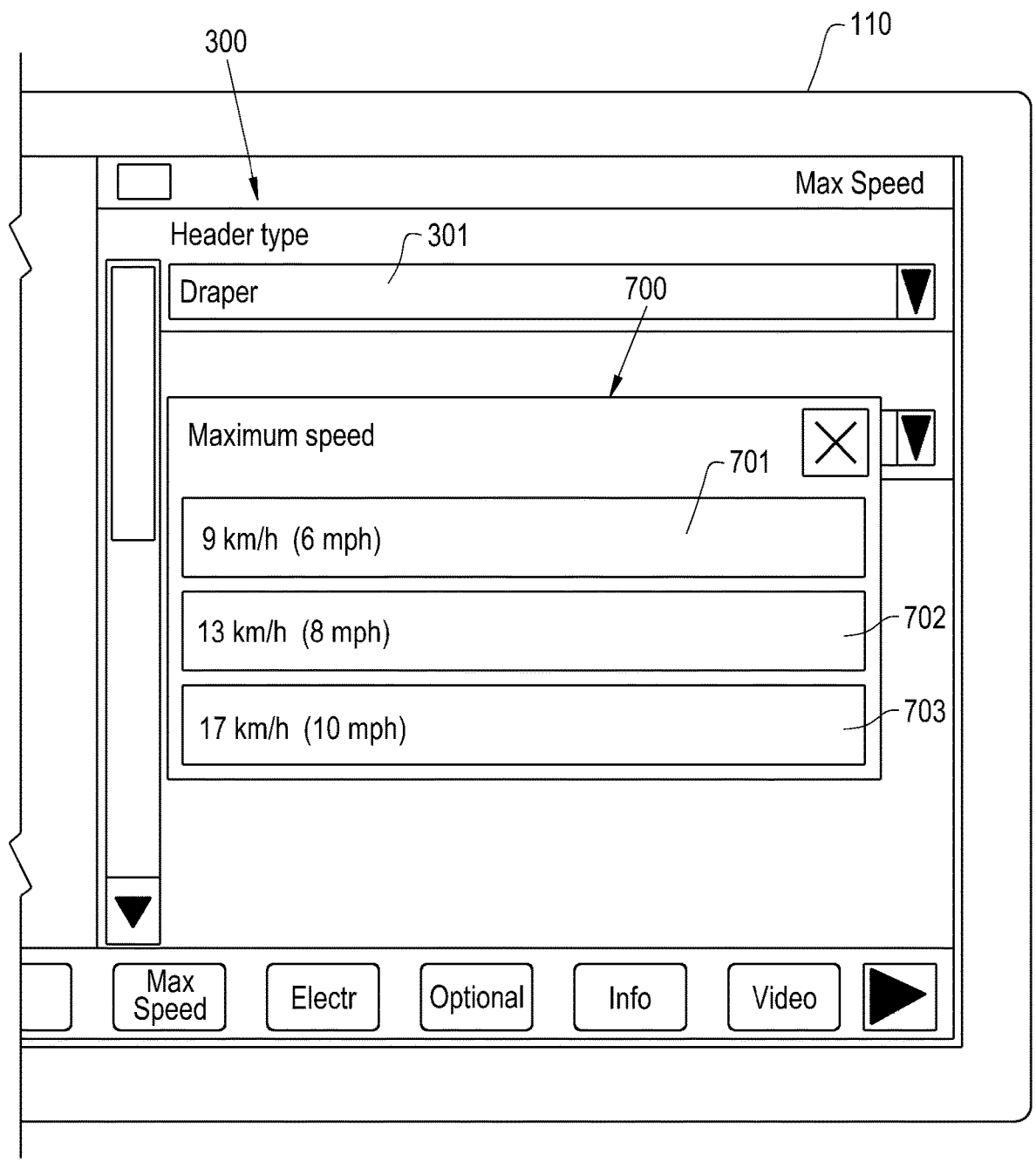
FIG. 7 illustrates a drop-down menu for selecting a maximum speed amount of the windrower of FIG. 1 when the header is a draper-type header, in accordance with an exemplary embodiment of the present disclosure.

Referring now to FIG. 7, the display 110 is illustrated when the header choice icon 403 is selected, which corresponds to a draper-type header, rather than the header choice icons 401 or 402. When the draper-type header choice icon 403 is selected, selecting the sub-menu selection icon 302 can pull up a maximum speed sub-menu 700 that presents various maximum propulsion speed icons 701, 702, 703 for selection. When the user selects the maximum propulsion speed icon 701, for example, the display 110 can output a new maximum propulsion speed signal to the controller 46. Upon receiving the new maximum propulsion speed signal, the controller 46 can output a new resolution signal to the wheel driver(s) 28 to define the maximum speed amount so it corresponds to a new maximum propulsion speed of 9 km/h. Alternatively, the user can select the maximum speed icon 702 or 703 to define the maximum speed amount so it corresponds to a new maximum propulsion speed of 13 km/h or 17 km/h, respectively, and a corresponding adjustment in the set resolution.

Figure 8:
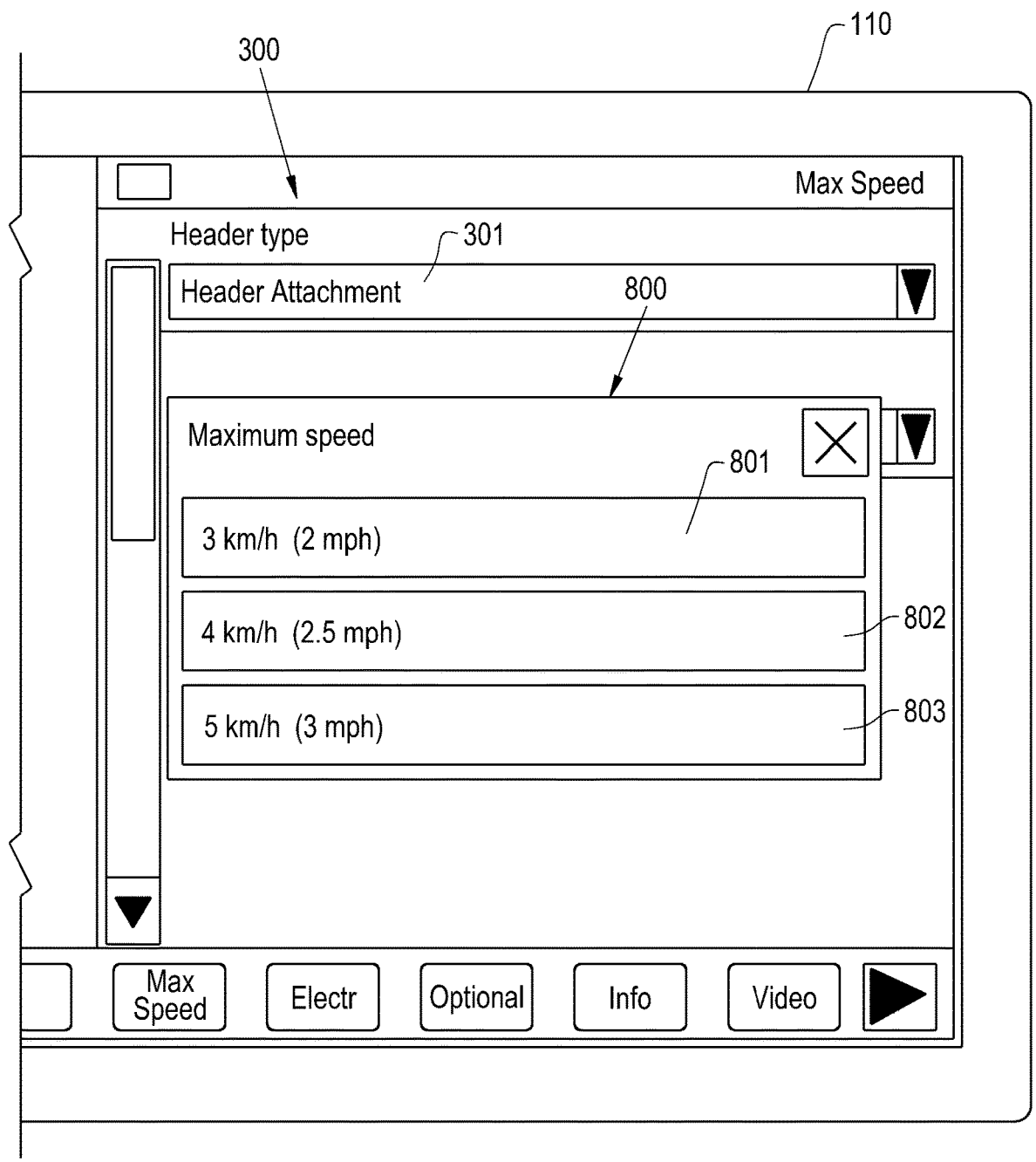
FIG. 8 illustrates a drop-down menu for selecting a maximum speed amount of the windrower of FIG. 1 when no header is attached and the user wishes to attach a header, in accordance with an exemplary embodiment of the present disclosure.

Referring now to FIG. 8, the display 110 is illustrated when the header choice icon 404 is selected, which corresponds to a header attachment configuration, rather than the header choice icons 401, 402, or 403. Unlike the header choice icons 401, 402, and 403, which all correspond to when the header type is an attached header, the header choice icon 404 can correspond to when the header 14 has been detached from and/or no header is attached to the windrower 10. When the header attachment choice icon 404 is selected, the display 110 can output a header attachment signal to the controller 46 so the controller 46 can determine that no header is attached to the windrower 10. Selecting the sub-menu selection icon 302 can then pull up a maximum speed sub-menu 800 that presents various maximum propulsion speed icons 801, 802, 803 for selection in the header attachment mode. As can be appreciated from comparing FIG. 8 to FIGS. 5-7, the maximum propulsion speeds presented in the maximum propulsion speed icons 801, 802, 803 are significantly less for when no header is attached to the windrower 14. This is because attaching the header 14 to the windrower 10 generally requires slow movement of the windrower 10, so a relatively sensitive set resolution of the control handle 40 assists the user in positioning the windrower 10 for header attachment.

When the user selects the maximum propulsion speed icon 801, for example, the display 110 can output a new maximum propulsion speed signal to the controller 46. Upon receiving the new maximum propulsion speed signal, the controller 46 can output a new resolution signal to the wheel driver(s) 28 to define the maximum speed amount so it corresponds to a new maximum propulsion speed of 3 km/h. Alternatively, the user can select the maximum speed icon 802 or 803 to define the maximum speed amount, which may also be referred to as a "header attachment speed amount" when no header 14 is attached, so it corresponds to a new maximum propulsion speed of 4 km/h or 5 km/h, respectively, and a corresponding adjustment in the set resolution. Thus, it should be appreciated that exemplary embodiments of the windrower 10 provided in accordance with the present disclosure can also have the set resolution of the control handle 40 adjusted to more sensitively control propulsion of the windrower 10 when no header is attached to assist a user when steering the windrower 10 to attach a header.

In some embodiments, the controller 46 is configured to automatically detect the header type of the header 14 based on, for example, one or more signals output by the attached header 14 to the controller 46. For instance, one or more components of the header 14 may be operably coupled to the controller 46 so the controller 46 can control various parameters of the header 14, such as a rotation speed of a cutting element of the header 14. In such a configuration, the controller 46 can receive the header type signal indicating the header type directly from the header 14 and automatically output the resolution signal to the wheel driver(s) 28 to define the maximum speed amount based at least partially on the received header type signal.

From the foregoing, it should be appreciated that the windrower 10 has an adjustable control handle 40 that can have different set resolutions based at least partially on the header 14 that is attached to the windrower 10. When the header 14 is a header that can operate at relatively high propulsion speeds, such as a disc-type header, the set resolution of the control handle 40 can be relatively insensitive to provide larger changes in propulsion speed of the windrower 10 for each centimeter of displacement of the control handle 40. When the header 14 is a header that operates at lower propulsion speeds, such as a sickle-type or draper-type header, the set resolution of the control handle 40 can be relatively sensitive to provide smaller changes in propulsion speed of the windrower 10 for each centimeter of displacement of the control handle 40. The controller 46 can also be configured to provide a very sensitive resolution of the control handle 40 when no header is attached to the windrower 10 to assist a user in maneuvering the windrower 10 while attaching a header. Thus, the set resolution of the control handle 40 can be easily adjusted to improve operating ease of the windrower 10 in various scenarios, such as when different types of headers are attached or when a header is being attached to the windrower 10.

Figure 9:
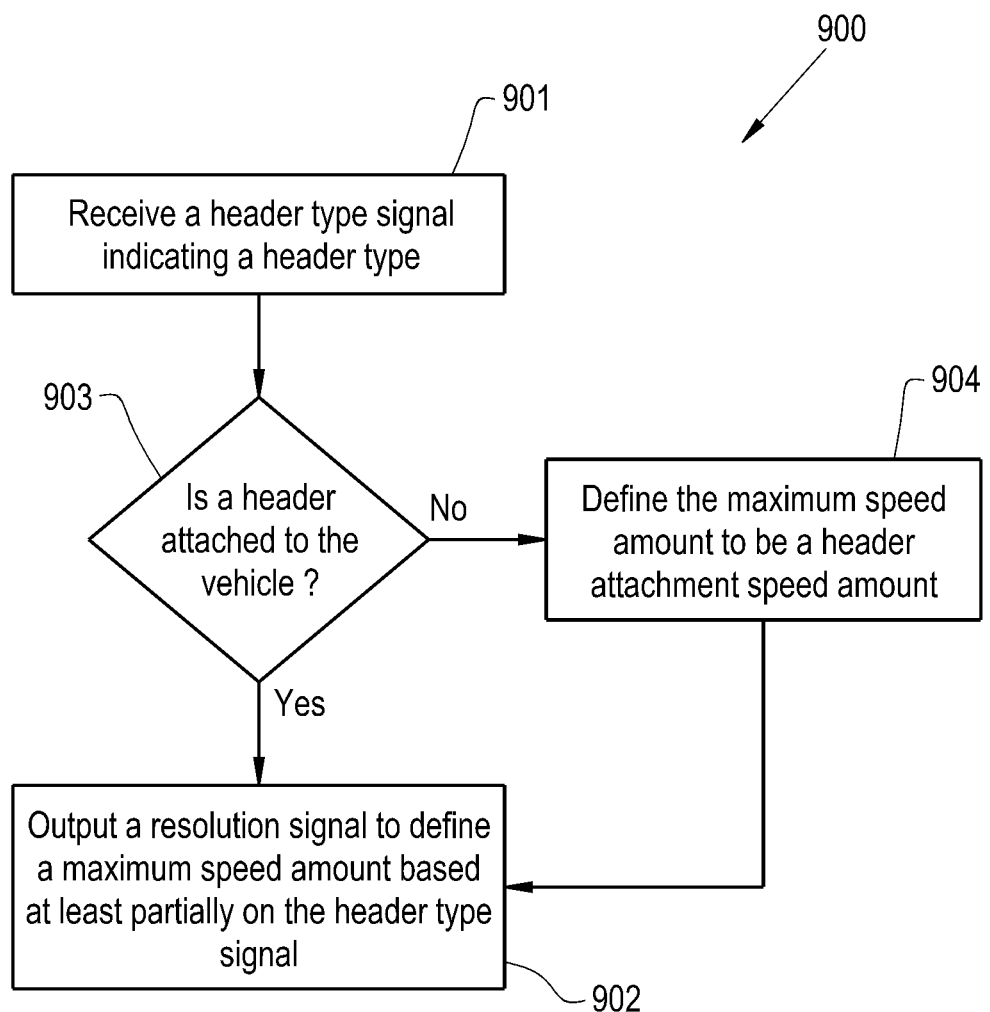
FIG. 9 is a flowchart illustrating an exemplary embodiment of a method of adjusting a speed resolution of a control handle of the windrower illustrated in FIG. 1, which is provided in accordance with the present disclosure.

Referring now to FIG. 9, an exemplary embodiment of a method 900 of adjusting a speed resolution of a control handle 40 of an agricultural vehicle 10 provided in accordance with the present disclosure is illustrated. The method 900 is performed by a controller, such as the previously described control 46, and includes receiving 901 a header type signal indicating a header type of a header, such as the header 14. In some embodiments, the header is a disc-type header, a sickle-type header, and/or a draper-type header, as previously described. The method 900 further includes outputting 902 a resolution signal to at least one wheel driver 28 to define a maximum speed amount at which the wheel driver(s) 28 drives at least one coupled wheel 24, 26, with the maximum speed amount generally corresponding to a propulsion speed of the vehicle 10. The resolution signal is based at least partially on the header type signal such that the maximum speed amount may vary depending on the type of header that is attached to the vehicle 10. The control handle 40 is displaceable from a zero speed position, such as a neutral position, to a maximum speed position and the wheel driver(s) 28 is configured to drive the at least one coupled wheel 24, 26 at the maximum speed amount when the control handle 40 is at the maximum speed position. In some embodiments, the wheel driver(s) 28 linearly increases a wheel drive speed of the at least one coupled wheel 24, 26 as the control handle 40 displaces from the zero speed position to the maximum speed position.

In some embodiments, the method 900 further includes determining 903 that no header is attached to the agricultural vehicle 10 and defining 904 the maximum speed amount to be a header attachment speed amount, which may be lower than the maximum speed amount for when a header is attached to the vehicle 10. The maximum speed amount may be defined to be: between 19 and 29 kilometers per hour if the header is a disc-type header; between 6 and 10 kilometers per hour if the header is a sickle-type header; between 9 and 17 kilometers per hour if the header is a draper-type header; or the header attachment speed amount between 3 and 5 kilometers per hour if no header is attached.

The agricultural vehicle 10 may include an operator cab 38 and a display 110 placed in the operator cab 30 that is operably coupled to the controller 46 and configured to output the header type signal to the controller 46 based on one or more selections by, for example, a user. Thus, in some embodiments the receiving 901 includes receiving the header type signal from the display 110. Alternatively, or additionally, the receiving 901 may include receiving the header type signal from one or more components of the attached header 14 or another element of the agricultural vehicle 10, such as a radio frequency identification (RFID) sensor, to eliminate the need for user input.

It is to be understood that the steps of the method 900 are performed by the controller 46 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 46 described herein, such as the method 900, is implemented in software code or instructions which are tangibly stored on a tangible computer readable medium. The controller 46 loads the software code or instructions via a direct interface with the computer readable medium or via a wired and/or wireless network. Upon loading and executing such software code or instructions by the controller 46, the controller 46 may perform any of the functionality of the controller 46 described herein, including any steps of the method 900 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
a chassis;
a header carried by the chassis;
an operator cab carried by the chassis;
a plurality of wheels carried by the chassis;
at least one wheel driver coupled to at least one of the wheels, the at least one wheel driver being configured to drive the at least one coupled wheel at a wheel drive speed;
a control handle placed in the operator cab, the control handle being displaceable from a zero speed position to a maximum speed position and operably coupled to the at least one wheel driver such that displacement of the control handle from the zero speed position to the maximum speed position changes the wheel drive speed by a maximum speed amount corresponding to a maximum propulsion speed of the agricultural vehicle; and
a controller operably coupled to the at least one wheel driver, the controller being configured to:
receive a header type signal indicating a header type of the header; and
output a resolution signal to the at least one wheel driver to define the maximum speed amount based at least partially on the received header type signal.

2. The agricultural vehicle of claim 1, wherein the at least one wheel driver is configured to linearly increase the wheel drive speed as the control handle displaces from the zero speed position to the maximum speed position.

3. The agricultural vehicle of claim 1, wherein the controller is further configured to:
determine that no header is attached to the agricultural vehicle; and
define the maximum speed amount to be a header attachment speed amount.

4. The agricultural vehicle of claim 3, wherein the controller is configured to:
define the maximum speed amount to be between 19 and 29 kilometers per hour if the header is a disc-type header;
define the maximum speed amount to be between 6 and 10 kilometers per hour if the header is a sickle-type header;
define the maximum speed amount to be between 9 and 17 kilometers per hour if the header is a draper-type header; and
define the header attachment speed amount to be between 3 and 5 kilometers per hour if no header is attached.

5. The agricultural vehicle of claim 1, further comprising a display placed in the operator cab and operably coupled to the controller, the display being configured to output the header type signal to the controller.

6. The agricultural vehicle of claim 5, wherein the display is configured to display a graphical user interface presenting a plurality of header choice icons, each of the header choice icons corresponding to a respective header type signal that is output to the controller when selected.

7. The agricultural vehicle of claim 5, wherein the display is configured to present a plurality of maximum speed choice icons in the graphical user interface, each of the maximum speed choice icons corresponding to a respective maximum speed amount.

8. A method of adjusting a speed resolution of a control handle of an agricultural vehicle, the agricultural vehicle comprising a plurality of wheels, at least one wheel driver coupled to at least one of the wheels and operably coupled to a controller, and a header, the method being performed by the controller and comprising:
receiving a header type signal indicating a header type of the header; and
outputting a resolution signal to the at least one wheel driver to define a maximum speed amount at which the at least one wheel driver drives the at least one coupled wheel, the maximum speed amount corresponding to a maximum propulsion speed of the agricultural vehicle, the resolution signal being based at least partially on the header type signal, the control handle being displaceable from a zero speed position to a maximum speed position and the at least one wheel driver being configured to drive the at least one coupled wheel at the maximum speed amount when the control handle is at the maximum speed position.

9. The method of claim 8, wherein the at least one wheel driver is configured to linearly increase a wheel drive speed of the at least one coupled wheel as the control handle displaces from the zero speed position to the maximum speed position.

10. The method of claim 8, further comprising:
determining that no header is attached to the agricultural vehicle; and
defining the maximum speed amount to be a header attachment speed amount.

11. The method of claim 10, wherein the maximum speed amount is defined by the controller to be:
between 19 and 29 kilometers per hour if the header is a disc-type header;
between 6 and 10 kilometers per hour if the header is a sickle-type header;
between 9 and 17 kilometers per hour if the header is a draper-type header; or
the header attachment speed amount between 3 and 5 kilometers per hour if the header has been detached.

12. The method of claim 8, wherein the agricultural vehicle comprises an operator cab and a display placed in the operator cab and operably coupled to the controller, the display being configured to output the header type signal to the controller.

13. The method of claim 12, wherein the display is configured to display a graphical user interface presenting a plurality of header choice icons, each of the header choice icons corresponding to a respective header type signal that is output to the controller when selected.

14. The method of claim 12, wherein the display is configured to present a plurality of maximum speed choice icons in the graphical user interface, each of the maximum speed choice icons corresponding to a respective maximum speed amount.

* * * * *